Patented Nov. 4, 1952

2,616,793

UNITED STATES PATENT OFFICE 2,616,793

PREPARATION OF CARBON DISULFIDE

Hillis O. Folkins, Crystal Lake, and Elmer Miller, Evanston, Ill., assignors, by mesne assignments, to Food Machinery and Chemical Corporation, New York, N. Y., a corporation of Delaware No Drawing. Application December 29, 1949, Serial No. 135,836

3 Claims. (Cl. 23—206)

This invention relates to a method of producing carbon disulfide and, in particular, to a catalytic process in which a hydrocarbon gas consisting principally of methane, is used as the source of carbon, and hydrogen sulfide or sulfur represent the second reactant.

Reaction between carbon and sulfur or between the hydrocarbon and sulfur to form carbon disulfide is known in processes to some extent, even in the absence of any catalysts. The traditional method of making carbon disulfide is to pass sulfur vapor over heated carbon, thereby to induce carbon disulfide formation. In the absence of a catalyst, extremely high temperatures of the order of 800° to 1000° C., are required to obtain commercial yields of carbon disulfide.

Accordingly, it is an object of our invention to provide an improved catalytic method of producing carbon disulfide wherein certain catalysts can be used to cause the reaction to proceed rapidly at lower temperatures.

It is another object of our invention to provide an improved supported catalyst which under any reaction conditions in which sulfur or hydrogen sulfide will react with a hydrocarbon will work a very material improvement in the conversion.

Other objects and advantages of our invention will in part be obvious and in part appear hereinafter.

Though it is known that many solid contact materials have a catalytic effect upon the reaction producing carbon disulfide from hydrocarbon gases and hydrogen sulfide or sulfur, there are vast numbers which do not have such an effect. For example, typical solid contact agents which promote the reaction are those disclosed in United States Patent 2,330,934, and include such catalysts as silica gel, fuller's earth, bauxite and activated alumina. The extension or enlargement of the group of useful catalysts for the process does not follow any logical or consistent rule, for it has been found that elements closely related in substantially all properties and in their chemical and physical nature, as well as position in the periodic system, result in the production in one case of an active material, and in the other case of an inactive one.

We have discovered that high yields of carbon disulfide can be obtained by reacting hydrocarbon gases rich in methane with sulfur in the presence of magnesium oxide supported on silica gel, the contact of the catalyst with the hydrocarbon gas and sulfur being brought about at a temperature which will induce reaction to form carbon disulfide, normally in the range from about 400° to 700° C., and at absolute pressures to levels of the order of several atmospheres. The magnesium oxide as such does not display a very high level of activity, but we have discovered that when it is supported on the silica gel and the oxide carefully deposited on the carrier, the resultant catalyst will have a valuable high level of activity and stability. This promotional effect on the support reaches a very useful level when the magnesium oxide is present in the amount of about 1 to 12 mol per cent, and appears to be at its greatest in the range from about 2 to 5 mol per cent.

In accordance with the invention, therefore, sulfur and hydrocarbons, such as methane, ethane, propane, butane or mixtures thereof, and mixtures of these hydrocarbons with olefinic hydrocarbon gases, such as refinery gases containing ethylene, propylene or butylene, which may be prepared for reaction in accordance with our application Serial Number 754,776 are preheated to a temperature approximating the desired reaction temperature, or to a level somewhat higher, which will be in the range from about 450° to 700° C., and preferably would be about 550° to 650° C. The hydrocarbon and the sulfur may be separately preheated and then mixed. The preheated mixture of hydrocarbon and sulfur is then charged to a reaction zone enclosing the catalyst, which may be in granular, pelleted, or other convenient form. Following a period of contact in the reaction zone determined by the space velocity in the range of 100 to 5000 depending upon the conditions of operation, the product gases are withdrawn and passed to a recovery system, which involves cooling the gases to condense the carbon disulfide, or separating the carbon disulfide from the hydrogen sulfide and unreacted hydrocarbons by absorption of the former in a suitable absorbent oil. The carbon disulfide is subsequently stripped from this oil and is condensed and purified.

Useful catalysts conforming to the invention may be made by coprecipitation of the magnesium and supporting material from aqueous solutions of the compounds and the catalyst metal compounds. Another more convenient method of preparing a catalyst is to deposit on a commercial silica gel the amount of magnesia desired as the promotor. This is conveniently accomplished by saturating the support with the theoretical amount of promoter metal, usually as nitrate salt, evaporating the solution to dryness, thereby precipitating the nitrate on the support, and subsequently decomposing the nitrate to oxide by ignition. Still another method is to prepare the magnesium oxide and support individually, and mechanically mix them. Following this, the resultant catalyst may be formed in pellets or other physical shapes, dried, and activated.

*Example 1.*—Having computed the amount of metal oxide which will be needed for the reaction on the scale contemplated, magnesium nitrate is dissolved in aqueous solution and the gel precipitated by reaction with ammonium hydroide. Following this, the gel is separated, washed, dried, and activated by heating very slowly to 500° C. in an inert atmosphere. Here the activation step is carried out by conducting the heating slowly in an inert atmosphere at a temperature below about 500° C.

*Example 2.*—Magnesia can also be prepared from magnesium nitrate solution by soaking the carrier therein, evaporating to dryness, and igniting it just intensely enough to decompose the nitrate to form the oxide.

*Example 3.*—Silica gel can be prepared in the amount needed from basic solution by precipitating it from a sodium silicate solution using an insufficient amount of hydrochloric acid to neutralize or acidify the entire amount of solution. The gel is then washed free of chloride and excess silicate, dried and heated to about 500° C. before use. The silica gel can also be prepared in acid solution by adding sufficient acid to the silicate to accomplish complete acidification of it, and the washing, drying and activation are carried out in the manner described.

Since commercial silica gel is available in grades equaling the purity of those which can be prepared in a laboratory, convenience will frequently dictate its use. It is merely necessary then to take the precaution of activating the gel by heating to 500° C. in nitrogen atmosphere.

The process for preparing carbon disulfide follows known manipulative techniques, in that it can be carried out at any absolute pressure up into ranges greatly in excess of atmospheric. Generally, it has been found advantageous to employ reaction pressures somewhat higher than atmospheric in order to charge the reaction products through the remainder of the apparatus without the necessity of compressing gases and for the purpose of increasing the residence time of reactants in the reaction zone under conditions of constant catalyst volume. Optimum contact between the catalyst and reactant is effected by passing the reactants through a stationary bed of granular or pelleted catalyst. Similarly, by passing the reactants through a moving bed of granular or pelleted catalyst, or by intimately mixing powdered catalyst with the reactant gases, thereby keeping the catalyst suspended in the reaction mixture during its passage through the reaction zone, effective conversion can be accomplished. Since the catalysts remain active for long periods of time under careful processing conditions, the stationary bed type of apparatus is simplest and most economical. It will be observed that the several means mentioned for contacting the reaction gases with catalysts are the common methods of contacting hydrocarbon gases with catalysts used in the petroleum processing industry.

The time of contact between the reactants and catalyst, or the space velocity, is determined principally by the temperature at which the reaction is carried out. In the neighborhood of 700° C., space velocities will preferably be high because the reaction progresses rapidly at these temperatures. At temperatures in the lower portion of the range, space velocities should be lower in order to maintain a high degree of conversion of the reactants.

Space velocity in this application is understood to have the standard definition: the total volume of reaction gases (sulfur vapor calculated as the $S_2$ modification) measured at 0° C. and 760 millimeters of mercury pressure, passing through a unit volume of catalyst per hour. For purposes of the carbon disulfide synthesis as described in the instant process, best results are obtained at space velocities of approximately 100 to 5000, although it is understood that different space velocities can be used.

Though the sulfur and hydrocarbons to be reacted are preferably mixed in a ratio closely approximating the stoichiometric ratio required to form carbon disulfide, any desired ratio can be used, for the excess gases are recovered and reprocessed. For obtaining the best conversion of a hydrocarbon to carbon disulfide, a small excess of the order of 10 to 15 per cent of sulfur may be used in the reaction mixture. Excess sulfur present in the reaction products can be readily recovered and recycled to the process.

The reaction may be carried out isothermally or adiabatically, and the product separated into its components by cooling it to a temperature below the vaporization point of sulfur, but above the boiling point of carbon disulfide under the existing pressure to condense residual sulfur. Cooling of the recovery gases to about 140° C. will maintain the molten sulfur in a mobile condition. The separation of carbon disulfide from hydrogen sulfide and unreacted hydrocarbons is accomplished by absorption of carbon disulfide in an absorbent oil, such as kerosene or a light gas oil fraction, and recovery is effected by stripping the carbon disulfide from the absorbent oil.

Hydrogen sulfide and hydrocarbons which are absorbed in the oil with the carbon disulfide in the absorption tower may be separated from it by distillation or stabilization and recycled to the absorption process to avoid loss of carbon disulfide which may be contained therein. Recovery of carbon disulfide from reaction products is effected in accordance with the method described in United States Patent 2,330,934. The final purification of carbon disulfide to separate traces of hydrogen sulfide and other sulfur impurities therefrom can be accomplished by fractional distillation or by chemical methods.

The following table summarizes some results obtained with typical catalysts from the group defined in this application:

*Table*

| Mol Percent Promoter | Support | 550° C. | |
|---|---|---|---|
| | | Space Velocity | Conv. Percent |
| None | None | 400 | 1.0 |
| Do | Silica Gel | 439 | 63.1 |
| MgO, 2.38 | ---do--- | 439 | 67.7 |
| None | ---do--- | 403 | 65.2 |
| MgO, 4.76 | ---do--- | 403 | 68.9 |
| None | ---do--- | 490 | 60.6 |
| MgO, 11.9 | ---do--- | 490 | 60.0 |

Methane and natural gas containing a high proportion of methane in accordance with our application Serial Number 754,776, was used as the reaction gas in each case. The stoichiometric amount of sulfur, within experimental limitations, was also used.

The data indicates that magnesium oxide per se is only moderately effective and not a very useful catalyst, but when supported on silica gel, it aids in promoting the reaction between hydrocarbon gases and sulfur vapor quite materially. In the purely thermal reaction, very little carbon disulfide is produced as shown in the table. However, contact of the reactants with the magnesia catalysts effects a substantial improvement in the operation.

Though the instant process has been described with only a limited number of examples pointing out the applicability of the process to the conversion of certain hydrocarbons to carbon disulfide at specific temperatures, it should be understood that the examples are intended to be illustrative and are not to be interpreted as limitations of the process.

What is claimed is:

1. The method of preparing carbon disulfide comprising, contacting a mixture of sulfur vapor and hydrocarbon gas with magnesium oxide in combination with silica gel as the catalyst, the amount of magnesium oxide in the supported catalyst being about 1 to 12 mol per cent of the support.

2. The method of preparing carbon disulfide comprising, contacting a hydrocarbon gas rich in methane with sulfur in approximately the stoichiometric ratio required for formation of carbon disulfide and hydrogen sulfide with magnesium oxide in combination with silica gel as the catalyst, the amount of magnesium oxide in the supported catalyst being about 1 to 12 mol per cent of the support, the process being carried out at a temperature of about 550° C.

3. The method in accordance with claim 2 in which the catalyst contains 2 to 5 mol per cent of magnesium oxide.

HILLIS O. FOLKINS.
ELMER MILLER.

REFERENCES CITED

The following references are of record in the file of this patent:

UNITED STATES PATENTS

| Number | Name | Date |
| --- | --- | --- |
| 1,992,832 | Mootz | Feb. 26, 1935 |
| 2,079,543 | Bley | May 4, 1937 |
| 2,330,934 | Thacker | Oct. 5, 1943 |
| 2,341,193 | Scheineman | Feb. 8, 1944 |